United States Patent [19]

Panthout

[11] 4,367,972
[45] Jan. 11, 1983

[54] ATTACHMENT ARRANGEMENT

[76] Inventor: Raymond Panthout, 7 allée Mouille-Boeuf, 92290 Chatenay Malabry, France

[21] Appl. No.: 28,530

[22] Filed: Apr. 9, 1979

[51] Int. Cl.³ .............................................. F16B 2/02
[52] U.S. Cl. .................................... 403/387; 403/400
[58] Field of Search ............... 403/387, 398, 399, 400; 248/228, 72; 269/91, 93, 94

[56] References Cited

U.S. PATENT DOCUMENTS

| 2,464,225 | 3/1949 | Graham | 403/387 |
| 2,507,783 | 5/1950 | Graham | 403/387 |
| 2,642,243 | 6/1953 | Kindorf | 403/387 |
| 3,144,105 | 8/1964 | Capek | 403/387 |
| 3,232,393 | 2/1966 | Attwood | 403/387 |

Primary Examiner—Andrew V. Kundrat
Attorney, Agent, or Firm—Weiser, Stapler & Spivak

[57] ABSTRACT

An attachment arrangement which includes a retaining bracket having clamping means and a bearing surface. The bracket has a cross-section which conforms to the outer shape of a bar to be attached to the flange of another beam. The bracket extends at one of its extremities into a bearing area which cooperates with the flanged beam.

12 Claims, 10 Drawing Figures

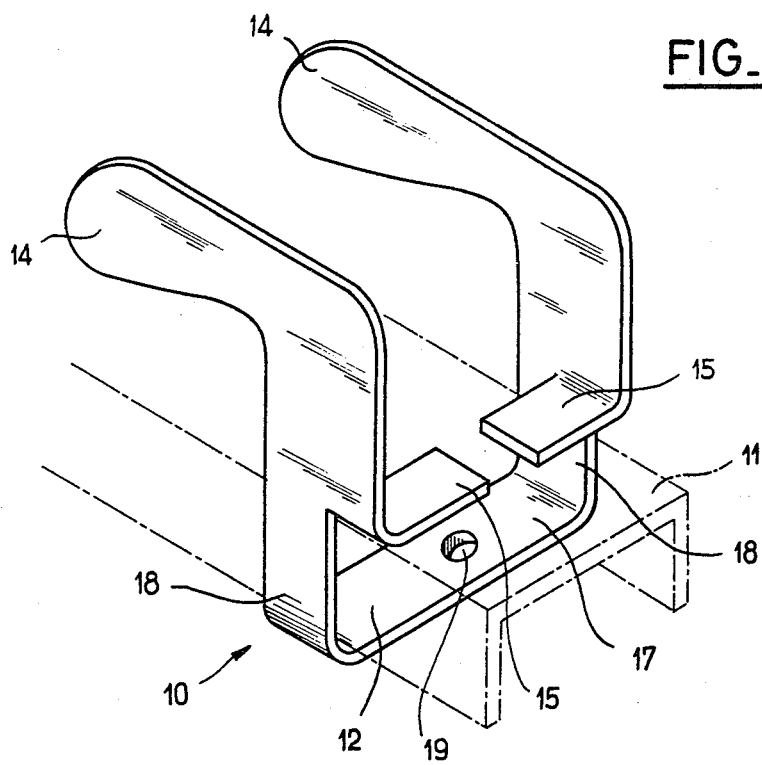
FIG_3
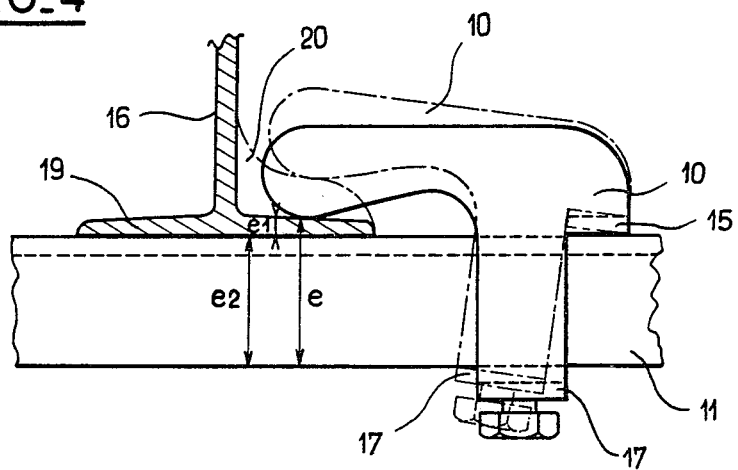
FIG_4

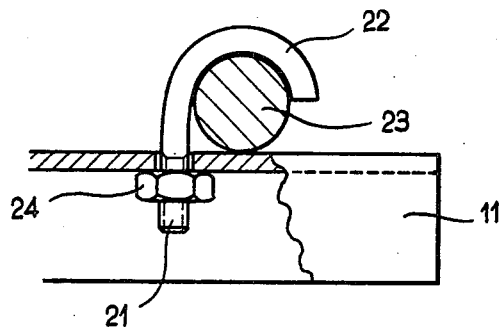
FIG_5
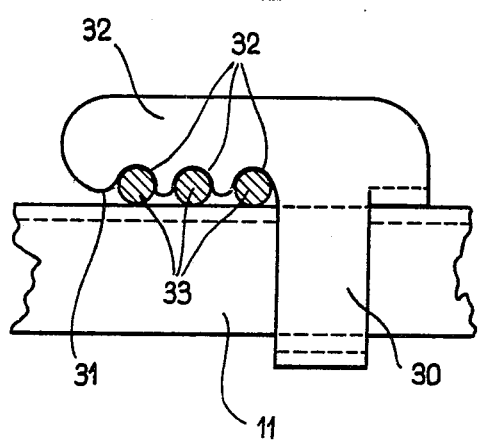
FIG_6
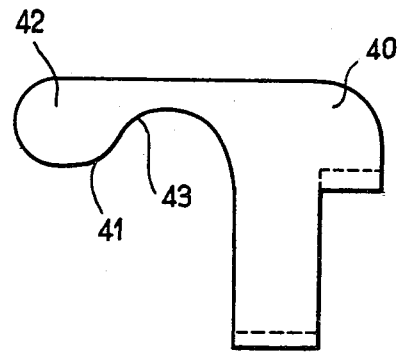
FIG_7
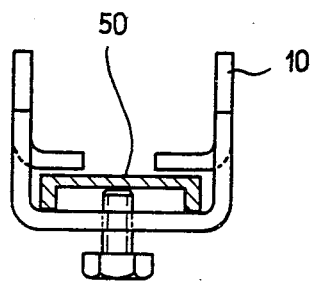
FIG_8
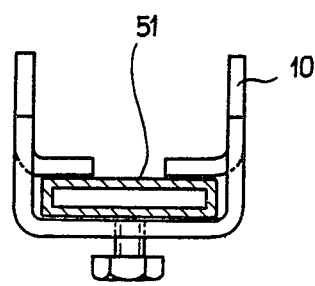
FIG_9

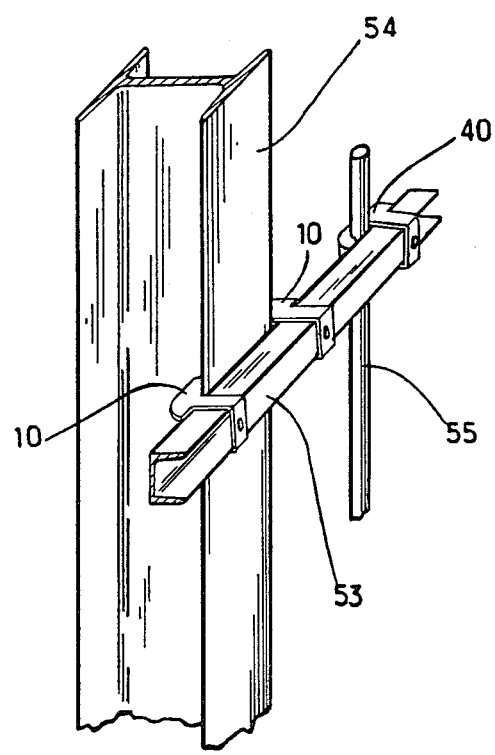
Fig: 10

ATTACHMENT ARRANGEMENT

The invention relates to an attachment arrangement intended particularly for connecting a bar- or beam-shaped member to the flange of an I-beam or the like.

Attachments are already known which make it possible to assemble bars to the flange of an I-beam. Such a conventional attachment arrangement involves using angle irons, which one attaches by bolting to the bar within which apertures are provided, one of the arms of the angle iron clamping the flange of the I-beam between the angle iron and the bar.

Such a solution is extremely burdensome to the degree that it is necessary to make apertures in the bar to be assembled. It is also necessary to cut the angle irons which also leads to an increase in the cost of this attachment arrangement. Finally, it is not possible to position the angle iron upon the bar with high precision, the position being determined by the apertures provided in the bar.

It is an object of the present invention to overcome these disadvantages and to provide an attachment arrangement which is simple to manufacture, low in cost, easy to work with, and which permits extremely accurate positioning with respect to the bar regardless of the thickness of the flange of the I-beam.

This and other objects which will appear are achieved in accordance with the invention by an attachment arrangement for connecting a bar- or beam-shaped member to the flange of an I-beam or the like, the arrangement being characterized by a retaining bracket for receiving the bar and provided with a means for clamping the bar against the bracket and of a bearing surface for the arrangement upon the bar, and an extension which forms a bearing area cooperating with the I-beam, the clamping surface of the attachment means against the bar being positioned at a longitudinally intermediate point with respect to the bar between the bearing surface against the bar and the bearing area upon the flange of the I-beam.

The attachment arrangement requires no aperture in the bar. Moreover it is capable of being positioned both in the longitudinal direction of the bar by sliding, as well as by pivoting, as a function of the height of the flange of the I-beam.

The particular configuration of the clamping means makes it possible to achieve effective attachment of the bar to the I-beam, the clamping forces acting on one side and the other of the clamping point at the locations of the bearing area and of the bearing surface.

According to another characteristic of the invention, the bearing surface consists of two plates curved backwards toward the interior within the rear portion of the arrangement, these plates constituting the upper wall of the bracket.

The bearing surface makes it possible not only to obtain an effective attachment but also to enable accurate positioning of the arrangement by sliding along the bar.

According to another feature of the invention, the lower side of each arm is provided with at least one cutout corresponding to the cross-section of tubes or the like intended to be attached to the bar.

The attachment arrangement also makes it possible to attach one or more tubes or cable bundles extending transversely to the bar to which these tubes or cables are to be attached.

According to another feature of the invention, the arrangement is manufactured by casting.

According to another feature of the invention, the arrangement is made by stamping and bending.

The particular construction of the attachment arrangement permits significantly lowering the price of the arrangement, compared with the selling prices of conventional arrangements currently used.

For further details concerning the invention, reference is made to an embodiment of the attachment arrangement, shown schematically by way of non-limiting example in the accompanying drawings, wherein:

FIG. 3 is a perspective view of the arrangement according to FIG. 2;

FIG. 4 is a side view of the attachment arrangement according to FIGS. 2 and 3;

FIG. 5 is a side view of another embodiment of an attachment arrangement forming part of the prior art;

FIG. 6 is a side view of a second embodiment of an attachment arrangement according to the invention;

FIG. 7 is a side view of a third embodiment of an attachment arrangement according to the invention;

FIG. 8 is a front sectional view of the arrangement according to FIGS. 3 and 4 in a first mounting mode;

FIG. 9 is a front sectional view of the arrangement according to FIGS. 2, 3 and 4 in a second mounting mode;

FIG. 10 is a perspective view of the arrangement of FIGS. 2, 3 and 4 mounted vertically.

Figure 1:
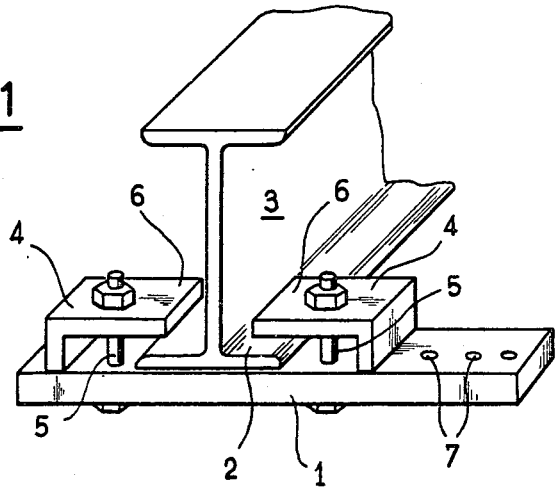
FIG. 1 is an illustration in perspective of an attachment arrangement forming part of the prior art.

According to FIG. 1, the attachment arrangement which makes it possible to join bar 1 to the flange 2 of beam 3 is a conventional attachment arrangement forming part of the prior art. This known arrangement consists primarily of angle irons 4 mounted on the bar 1 by means of bolts 5. Thus, for clamping, arm 6 of angle iron 4 bears upon the flange 2 and unites the same to bar 1. To adjust the positioning of angle irons 4 upon bar 1, it is necessary to provide apertures 7. This already considerably increases the price of this attachment means. Moreover, the angle irons 4 must be cut as a function of the height of flange 2. A given angle iron 4 cannot be used to assemble bars to I-beam whose flange is of a different thickness. This also causes a substantial increase in the price of this attachment arrangement, because it is necessary to provide angle irons 4 which are precisely matched to the dimensions of the I-beams.

Figure 2:
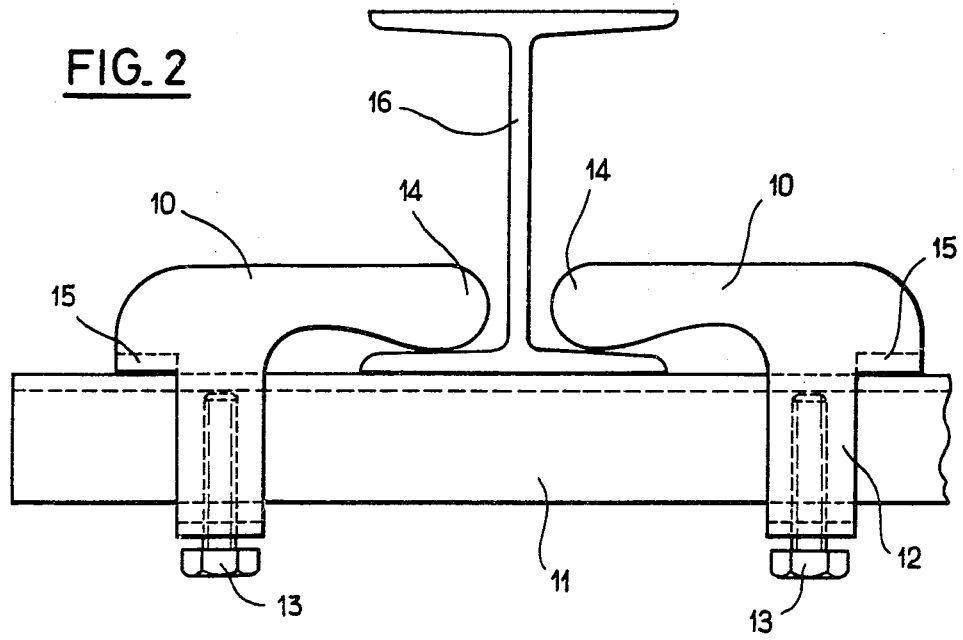
FIG. 2 is an elevation of the attachment arrangement embodying the invention in its working position.

According to FIG. 2, the attachment arrangements 10 are made so as to be capable of sliding on bar 11. Each arrangement 10 includes a retaining bracket 12 which enables its mounting upon bar 11. Each arrangement 10 further has clamping means 13, a bearing area 14 and a bearing surface 15. The clamping means 13 consists of bolts which bear against the bar which is to be attached to I-beam 16. Upon clamping, the attachment forces are exerted in the regions of the bearing area 14 and of the bearing surface 15. It is to be noted that the clamping means 13 is positioned at an intermediate point along the length of the bar 11 between the bearing surface 15 and the bearing area 14. Thus bearing area 14 and bearing surface 15 are positioned ahead of and behind the clamping point. This permits more effective fixation of beam 11 upon I-beam 16.

According to FIG. 3, the attachment arrangement 10 includes a bracket 12, defined by the clamping surface 17, by the bearing surface 15 and by the arms 18 of the arrangement. These arms 18 form at their free ends a bearing area 14. The bracket 12 enables sliding mounting upon beam 11. Bracket 12 has a cross-section corresponding to the outer contour of the bar 11 intended to be attached to the I-beam. The clamping surface includes a threaded aperture 10 which permits passage of bolt 13 not shown in this figure. The bearing surface 15 consists of plates which are curved backward toward the interior thus defining the upper wall of bracket 12. Bearing surface 15 is displaced toward the rear relative to the clamping surface 17. Arms 18 form bearing protrusions of rounded shape in the area of their bearing area 14. Arms 18 are parallel and extend lengthwise of bar 11. Bearing area 14 and bearing surface 15 are positioned on one side and the other of clamping surface 17, thus enabling effective fixation of the bar upon the beam.

According to FIG. 4, the attachment arrangement 10 has been represented both in solid and broken lines. In its solid line position the attachment arrangement 10 permits the attachment of a bar 11 to an I-beam 16, the bar 11 and flange 19 having dimensions such that $e = e_1 + e_2$. e is a variable dimension to the extent that $e_1$ and $e_2$ are also variabled. In order that the dimension e can vary, it is necessary that the clamping surface 17 not be opposite the bearing surface 15. This makes it possible to adapt the attachment arrangement 10 to flanges 20 of I-beams. This adaptation, which is shown in broken lines, is possible because of a pivoting movement of the attachment arrangement 10. Regardless of the dimensions of flanges 19, 20 and of bar 11, it is possible to adapt the attachment arrangement 10 to insure fixation of beam 11 upon I-beam 16.

According to FIG. 5, the attachment arrangement 21 consists of a hook 22 intended to clamp around a tube or a cable bundle 23. The attachment 21 is clamped upon tube 23 by a nut 24 which makes it possible to tighten the hook 22 upon the tube. This conventional attachment arrangement which is part of the prior art can be used only for a single tube of predetermined cross-section. Moreover it has the same disadvantages previously described relating to the fact that the attachment of such an arrangement requires apertures in bar 11. Moreover it is not possible to achieve accurate positioning of this arrangement 21 on the bar.

According to FIG. 6, the attachment arrangement 30, according to the invention, is largely analogous to the attachment arrangement 10 previously described. Only the lower side 31 of branch 32 differs from the arrangement 10 previously described. In effect, the side 31 is provided with cutouts 32 enabling the simultaneous reception of several tubes, or several bundles of wire 33 upon beam 11.

Likewise in FIG. 7 the attachment arrangement 40 is provided on the lower side 41 of branch 42 with a cutout 43 for receiving a tube or a cable bundle.

The attachment arrangements 30 and 40 permit effective fixation of tubes upon a bar with very accurate positioning upon the bar 11 and with lower cost, bearing in mind that the attachment as previously described is carried out without any prior cutting into the bar.

According to FIGS. 8 and 9, the attachment arrangements 10 are adapted to be mounted on beams of varying shapes. Thus, in FIG. 8, the bar 50 is of inverted U shape. On the other hand, in FIG. 9, the bar 51 has a rectangular cross-section.

In both cases, the attachment arrangement 10 is readily adaptable and permits accurate positioning of the arrangement upon the bar.

According to FIG. 10, the bar 53 is mounted upon an I-beam 54 by means of arrangements 10 previously described. This figure highlights the possibility of using the attachment arrangement 10 in a vertical rather than horizontal position.

The description contemplates either horizontal or vertical attachment. In no case does this limit the field of application of the invention because any inclined position is possible. The same is true for the supports which may be I-beams, simple angle irons, juxtaposed angle irons, U-shaped beams, etc., and indeed generally any support having a flange which permits mounting of the attachment arrangement according to the invention.

Tube 55 is attached by an arrangement 40, for example upon bar 53, this mounting being also made in the vertical position of the tube.

The attachment arrangements 10, 30 and 40 are made either by casting or by stamping and bending, which also reduces their price. These various attachment arrangements thus provide a wide range of applications without requiring cutting into the beam but while providing effective fixation.

It will be understood that the invention is not limited to the embodiments described and illustrated above, but that these may lead to other forms and other embodiments without departing from the scope of the invention.

I claim:

1. Attachment arrangement for connecting a bar- or beam-shaped member to the flange of an I-beam or the like, the arrangement comprising
    a retaining bracket for receiving the bar to be attached and provided with means for clamping the bracket to one side of the bar and with a bearing surface at which the arrangement bears against the opposite side of the bar, and
    an extension defining a bearing area cooperating with the flange of the I-beam which adjoins said opposite side of the bar, the clamping means having a surface which clamps against the bar and which is located at an intermediate point along the length of the bar between the bearing surface against the bar and the bearing area against the flange of the I-beam.

2. The attachment arrangement of claim 1 wherein the clamping surface is defined by the underside of the bracket.

3. The attachment arrangement of claim 1 wherein the bearing surface is formed by two plates extending toward each other at the rear of the bracket, the same plates also constituting the top wall of the bracket.

4. The attachment arrangement of claim 1 wherein the clamping means includes a bolt bearing against the bar.

5. The attachment arrangement of claim 1 in which the bracket is formed by casting.

6. The attachment arrangement of claim 1 in which the bracket is formed by stamping and bending.

7. The attachment arrangement of claim 1 wherein the bearing area consists of two parallel arms, extending lengthwise of the bar, portions of said arms also forming the side walls of the bracket.

8. The attachment arrangement of claim 7 wherein the lower side of each arm is provided with at least one cutout corresponding to the cross-section of a tube or the like intended to be attached to the bar.

9. The attachment arrangement of claim 1 wherein the bracket extends around the bar along at lest a part of all four sides of the bar.

10. The attachment arrangement of claim 9 wherein the interior shape of the bracket conforms generally to the outer contour of the bar.

11. Attachment arrangement for connecting a bar- or beam-shaped member to the flange of an I-beam or the like, the arrangement comprising a retaining bracket for receiving the bar to be attached and provided with means for clamping the bar to the bracket and with a bearing surface at which the arrangement bears against the bar, and an extension defining a bearing area cooperating with the I-beam, the clamping means having a surface which clamps against the bar and which is located at an intermediate point along the length of the bar between the bearing surface against the bar and the bearing area against the flange of the I-beam, the bearing area consisting of two parallel arms, extending lengthwise of the bar, portions of said arms also forming the side walls of the bracket, and the extremities of the arms being rounded to form a bearing lobe.

12. Attachment arrangement for connecting a bar- or beam-shaped member to the flange of an I-beam or the like, the arrangement comprising a retaining bracket for receiving the bar to be attached and provided with means for clamping the bar to the bracket and with a bearing surface at which the arrangement bears against the bar, and an extension defining a bearing area cooperating with the I-beam, the clamping means having a surface which clamps against the bar and which is located at an intermediate point along the length of the bar between the bearing surface against the bar and the bearing area against the flange of the I-beam, the bracket extending around the bar along at least a part of all four sides of the bar, and the interior dimensions of the bracket being sufficiently larger than the bar to permit tilting of the bracket on the bar to accommodate different flange thickness of the beam.

* * * * *